United States Patent [19]

Takemoto et al.

[11] Patent Number: 5,323,184
[45] Date of Patent: Jun. 21, 1994

[54] APPARATUS FOR RECORDING IMAGE ON PHOTOSENSITIVE MATERIAL

[75] Inventors: Hiroaki Takemoto; Masafumi Tagaya, both of Kyoto, Japan

[73] Assignee: Dainippon Screen Mfg. Co., Ltd., Japan

[21] Appl. No.: 823,302

[22] Filed: Jan. 21, 1992

[30] Foreign Application Priority Data

Jan. 25, 1991 [JP] Japan .................. 3-007736

[51] Int. Cl.$^5$ .................. H04N 1/21; G01D 15/16; B41J 2/435
[52] U.S. Cl. .................................. 346/108
[58] Field of Search ............... 346/1.1, 76 L, 108, 346/107 R, 160

[56] References Cited

U.S. PATENT DOCUMENTS 4,141,650 2/1979 Nishikawa et al. ............ 355/211
4,557,586 12/1985 Hayashi et al. ............ 355/211

Primary Examiner—Mark J. Reinhart
Attorney, Agent, or Firm—Ostrolenk, Faber, Gerb & Soffen

[57] ABSTRACT

The present invention provides an apparatus for recording an image on a photosensitive material, wherein a recording drum 2 is enclosed with an enclosure 10 in which an opening 12 is provided in the direction of movement of a recording head 6. The opening 12 is covered with a light shield member 14 and the light shield member 14 is wound by winding shafts 24 and 26 at its both ends. To the light shield member 14 there is provided a through hole 16, into which an image forming lens 18 of the recording head 6 is inserted. Thus the recording head 6 is allowed to be movable and light shielding is effected only by the small-sized enclosure 10.

13 Claims, 9 Drawing Sheets

APPARATUS FOR RECORDING IMAGE ON PHOTOSENSITIVE MATERIAL

BACKGROUND OF THE INVENTION

1. Technical Field of the Invention

The present invention relates to apparatus for an image on photosensitive material such as a recording unit of a color scanner, a laser printer and a laser plotter and, more particularly, relates to improvement in facilitation of manufacture and maintenance thereof.

2. Related Art

FIG. 1 illustrates a conventional apparatus of a color laser plotter. Held to a recording drum 102 is a photosensitive material 104, which is driven to rotate by a driving source (not shown). To a recording head 106, a recording signal is fed. Receiving the signal, the recording head 106 emits a laser beam corresponding to the recording signal toward the photosensitive material 104 on the recording drum 102, thereby making the photosensitive material 104 exposed to the laser beam. The recording head 106 is arranged to be movable in the direction A parallel to the axial direction of the recording drum 102. Rotation of the recording drum 102 and movement of the recording head 106 render the photosensitive material 104 to be entirely exposed to the laser beam.

However, the conventional apparatus as mentioned above has confronted some problems as described below. When the photosensitive material 104 is sensitive to natural light, it is necessary to accommodate both the recording drum 102 and the recording head 106 into an enclosure 108 to shield the photosensitive material 104 from the natural light. The enclosure 108 is so large in size as to make the assembling thereof laborious work, and moreover the filling of clearances difficult. In brief, the large-sized enclosure 108 is caused increase in cost heretofore.

Also, since a light source (not shown) produces heat in the recording head 106, the enclosure 108 is required to cool therein. It, however, is difficult to satisfy both the requirements of light shielding and cooing at the same time.

Further, in exercising maintenance of the recording drum 102 and the recording head 106, the large-sized enclosure 108 is necessarily removed, causing reduction in work efficiency.

SUMMARY OF THE INVENTION

Accordingly, the object of the present invention is to provide an exposure recording apparatus which can solve the foregoing problems and which is easy to assemble and simple to maintain.

An apparatus for recording an image on a photosensitive material, comprises:

a recording drum for holding said photosensitive material on the surface thereof;

first driving means for rotating said recording drum in a main scanning direction;

an enclosure, made of an opaque material, for enclosing said recording drum, said enclosure having a transparent portion extended in a sub-scanning direction perpendicular to said main scanning direction;

a recording head for emitting a recording bean modulated by an image signal toward the surface of said recording drum by way of said transparent portion;

second driving means transferring said recording head in said sub-scanning direction; and light shield means for preventing light other than said recording beam from transmitting in said enclosure.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
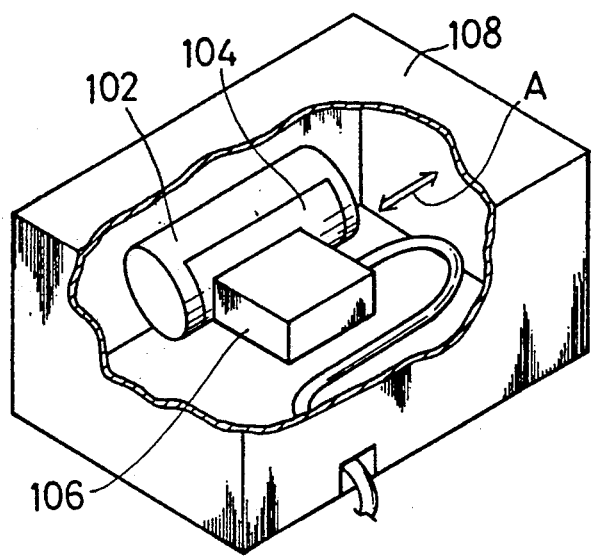
FIG. 1 is a view showing a conventional color laser plotter.
Figure 2:
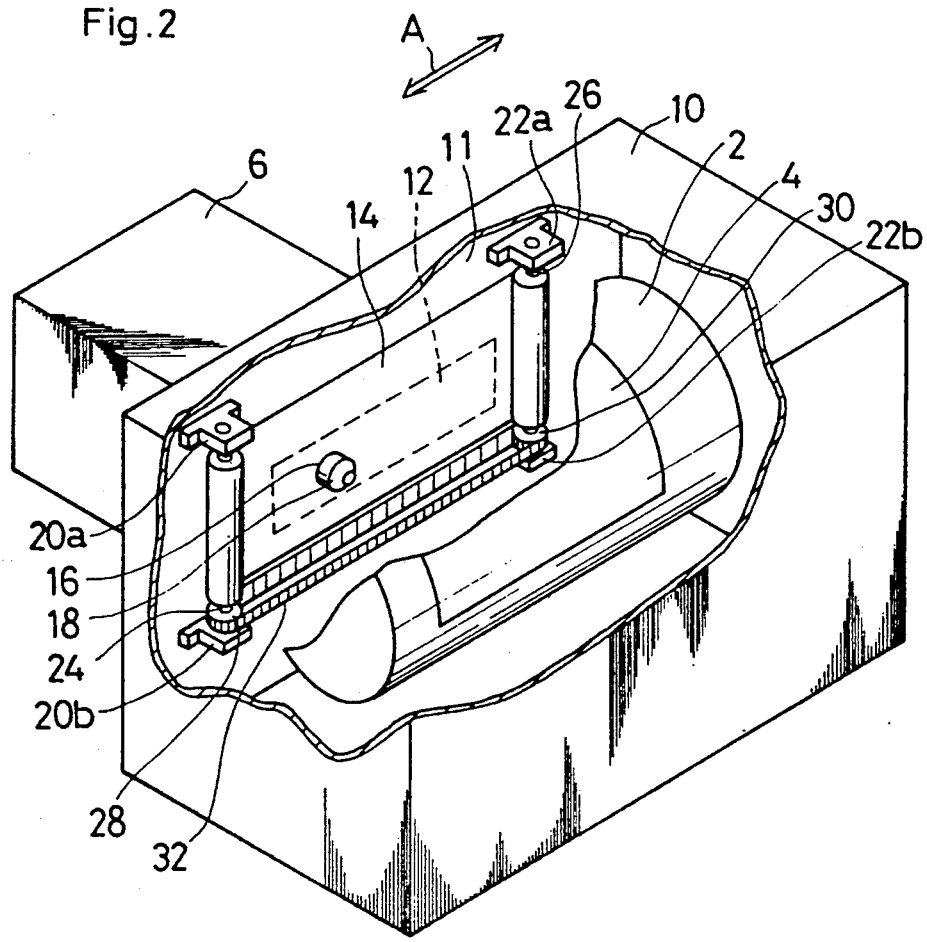
FIG. 2 is a perspective view of a color laser plotter according to the present invention.
Figure 3:
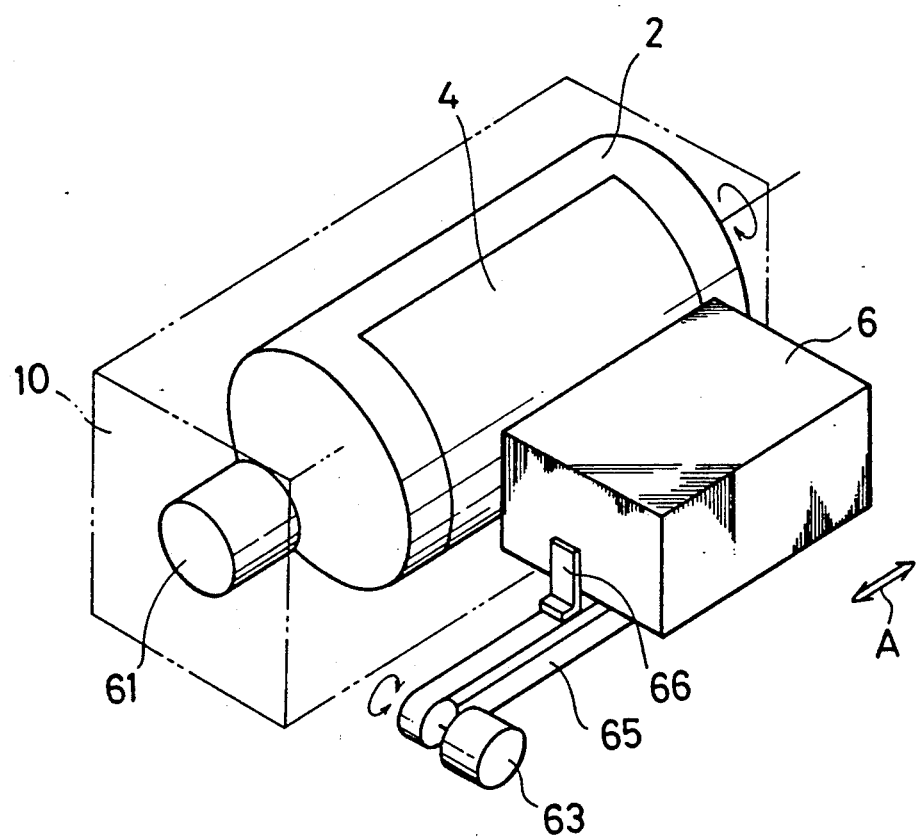
FIG. 3 is a perspective view of the drive mechanism for the recording head 6 and recording drum 2.

FIG. 2 illustrates a color laser plotter according to the present invention. Inside an enclosure 10 there is accommodated a recording drum 2. A photosensitive material 4 sensitive to natural light is held to the recording drum 2 by vacuum adsorption or the like. The recording drum 2 is driven to rotate by a main scanning drive motor 61, as shown in FIG. 3. The recording head 6 is secured to a sub-scanning drive belt 65 with a bracket 66, and is driven in the direction A by a sub-scanning drive motor 63 via the sub-scanning drive belt 65.

Referring to FIG. 2, the enclosure 10 has a plate 11 which faces the recording head 6 and is provided an opening 12. A light shield member 14 made of cloth is provided so as to cover the opening 12, the light shield member 14 serving to prevent light incident to the inside of the enclosure 10. The light shield member 14 has a through hole provided therein, into which through hole 16 there is inserted an image forming lens 18, which is an end of the recording head 6. This insertion portion is also light shielded. Accordingly, as the recording head 6 moves in the direction A, the light shield member 14 also moves in the same direction, thereby keeping the inside of the enclosure 10 from light. At both ends of the light shield member 14 there are provided winding shafts 24 and 26 held by two set of upper and lower brackets 20a, 20b, 22a and 22b, serving to take up the light shield member 14.

In addition, in this embodiment, there is provided a transmission mechanism between the winding shafts 24 and 26 to ensure the winding and feeding of the light shield member 14 along with the movement of the recording head 6. Specifically, on lower portions of both winding shafts 24 and 26 there are provided pulleys 28 and 30 and a belt 32 stretched across the pulleys 28 and 30. This arrangement allows the two winding shafts 24 and 26 to be coincident in rotation with each other, thus ensuring the feeding and winding of the light shield member 14.

Figure 4:
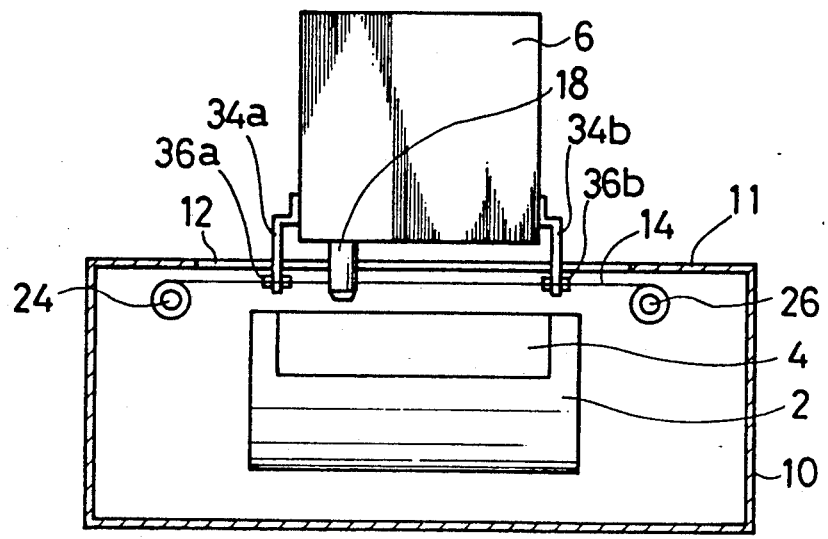
FIG. 4A and 4B are sectional views of the color laser plotter.
Figure 4:
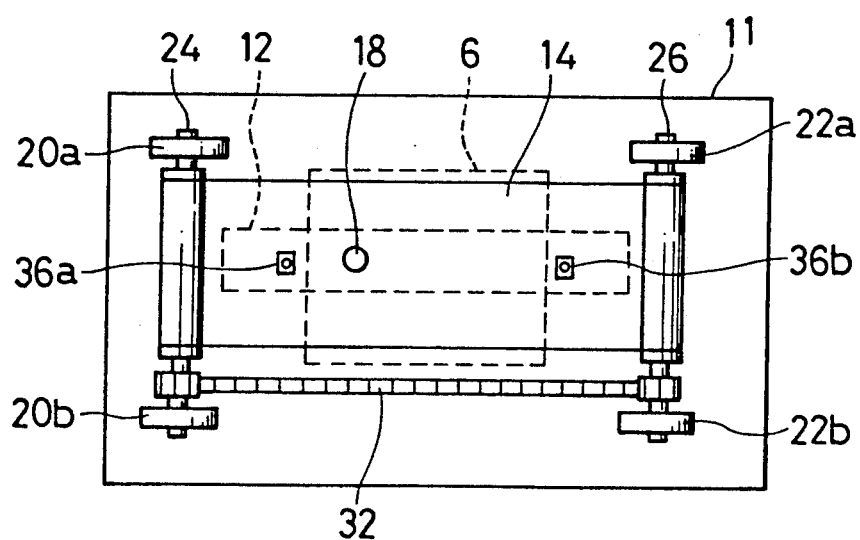

FIG. 4A shows a plan section of the color laser plotter of FIG. 2. FIG. 4B shows a view of the inside of the enclosure 10 as viewed from the vicinity of the light shield member 14. On the sides of the recording head 6 there are provided stays 34a and 34b. The end portions of the stays 34a and 34b are secured to the light shield member 14 by brackets 36a and 36b, respectively. Therefore, as the recording head 6 moves, the light shield member 14 also moves positively.

The above-described arrangement enables the recording head 6 to move while light shielding is effected by the enclosure 10, which is of such a size as to cover only the recording drum 2. Also, the enclosure 10 does not contain the recording head 6, which is accompanied by heat generation, thus eliminating the need of taking into account the heat from the enclosure 10.

Figure 5:
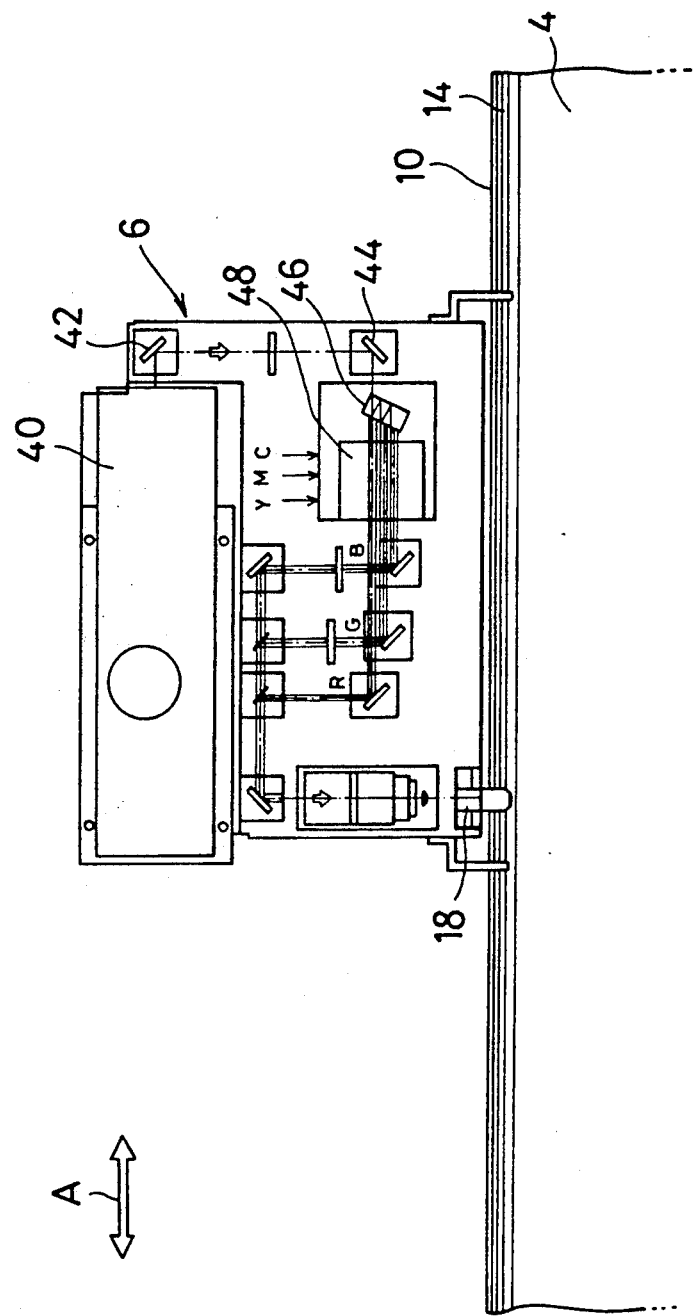
FIG. 5 is a view showing the detail of the recording head 6.

FIG. 5 shows the recording head 6 in detail. A white laser beam emitted from a laser light source 40 is incident to a beam splitter 46 containing a dichroic mirror via mirrors 42 and 44. In the beam splitter 46, the white laser beam is separated into three wavelength components, red (R), green (G), and blue (B). The separated laser beams are modulated according to corresponding image signals Y, M, and C in an acousto-optic modulator (AOM) 48. These beams are further made incident on the image forming lens 18 through a combining optical system, being applied to the photosensitive material 4. The recording head 6 is movable in the direction indicated by arrow A and the recording drum 2 is also rotatable, and therefore the photosensitive material 4 can be recorded an image corresponding to the image signals Y,M and C by the exposure of the laser beams.

Figure 6:
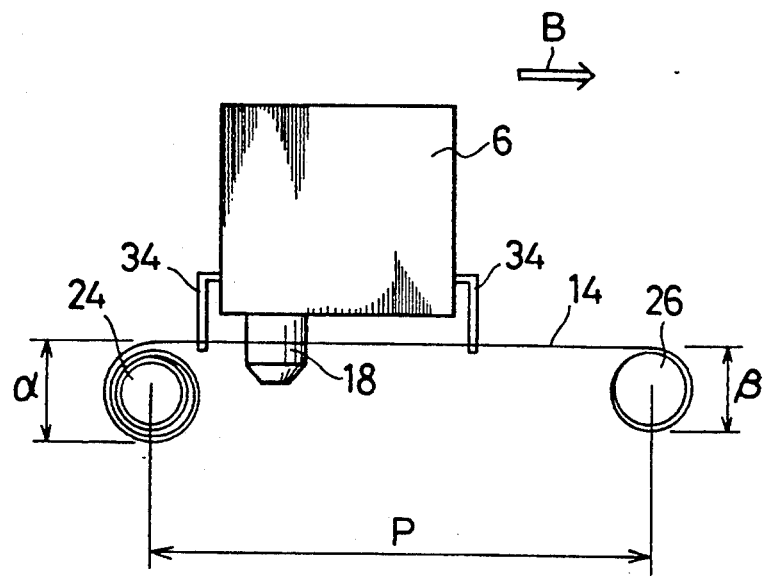
FIG. 6 is a view showing the take-up state of a light shield member 14.
Figure 7:
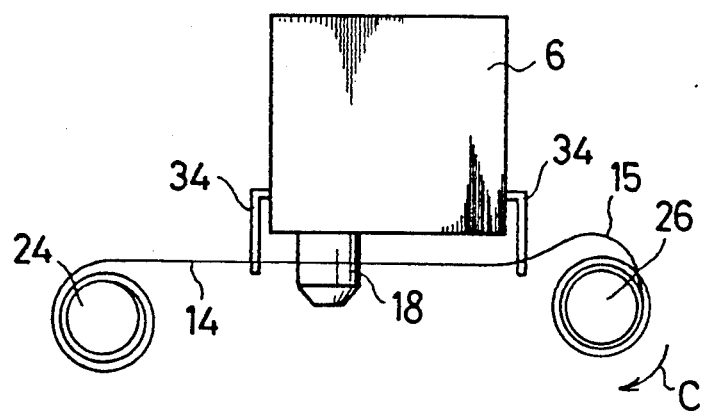
FIG. 7 is a view showing the take-up state of the light shield member 14.

This being the case, there may arise a problem as below with respect to the winding of the light shield member 14. When the recording head 6 is in such a position as shown in FIG. 6, the winding diameters α and β of the light shield member 14 taken up by the two winding shafts 24 and 26 differ from each other. Despite the different winding diameters, the winding shafts 24 and 26 are made to have the same rotating speed by the belt 32 as shown in FIG. 2. Accordingly, as the recording head 6 moves in the direction indicated by arrow B, there arises a slack 15 to the light shield member 14 as shown in FIG. 7. This may cause reduction in the light shielding effect.

The aforementioned problem is of no significance in practical use when the distance P between the two winding shafts 24 and 26 is short or when the light shield member 14 is thin. However, it will matter if the distance P is long or if the light shield member 14 is thick.

Figure 8:
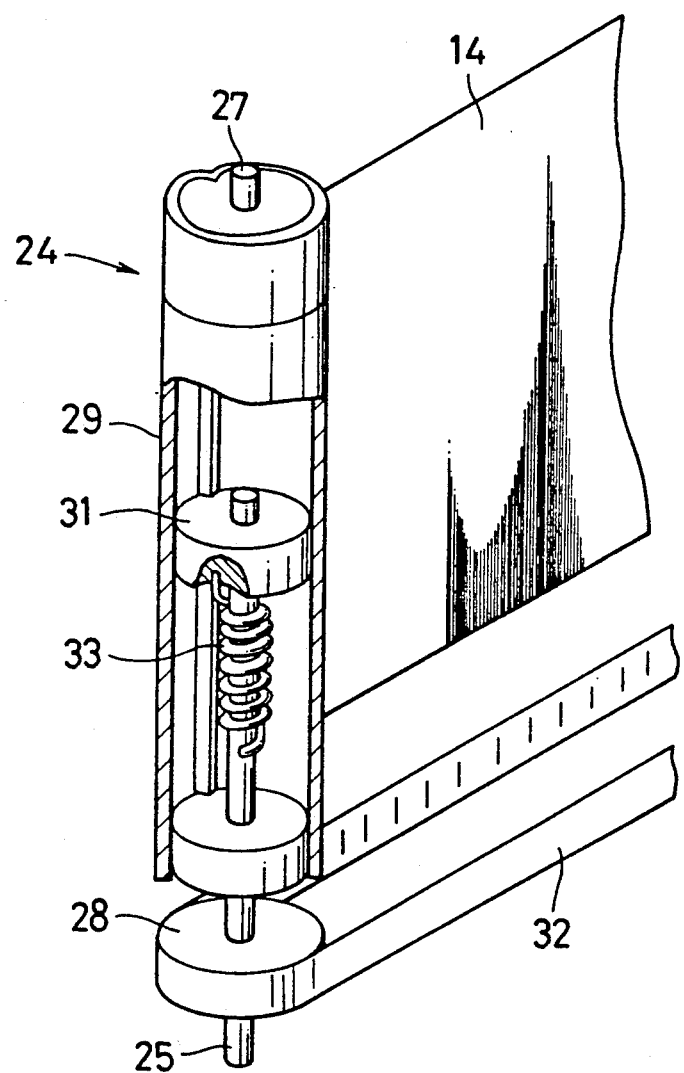
FIG. 8 is a perspective view showing the detail of a winding shaft 24 in another embodiment of the present invention.

In such a case, the problem can be eliminated by using a winding shaft 24 as shown in FIG. 8 (the case is the same with the winding shaft 26). This winding shaft 24 is equipped with a first shaft 25 and a second shaft 27. The first shaft 25 has a pulley 28 secured thereto to drive the belt 32, while the second shaft 27 has a pipe 29 secured thereto. Within the pipe 29 there is provided an intermediate disc 31 which makes the same rotation as that of the pipe 29. The transmission of rotating force between the first shaft 25 and the intermediate disc 31 depends only on a coil spring 33. Accordingly, if force more than the tension of the coil spring 33 is applied to the first shaft 25, the first shaft 25 will rotate with respect to the second shaft 27. In assembling it is arranged that the first shaft 25 is made to rotate with respect to the second shaft 27 so as to make the light shield member 14 subject to a certain extent of tension. With the use of such winding shafts, even if such a state occurs as shown in FIG. 7, it is possible to absorb the slack 15 by rotation of the winding shaft 26 in the direction indicated by arrow C.

Figure 9:
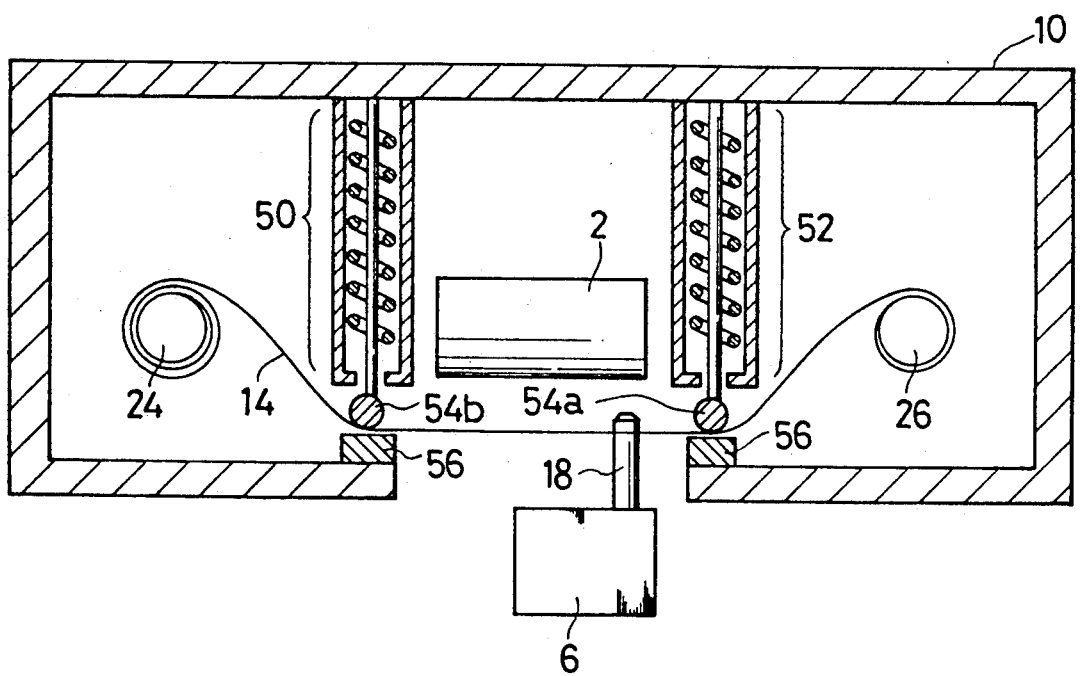
FIG. 9 is a view for explaining another structure for preventing the slack of the light shield member 14.

Otherwise, as shown in the view of FIG. 9, it is also possible to arrange elastic unit 50 and 52 for normally applying the elastic force to the light shield member 14 and an opaque sponge 56 for absorbing the elastic force, thereby allowing the slack to be absorbed by the elastic force.

Figure 10:
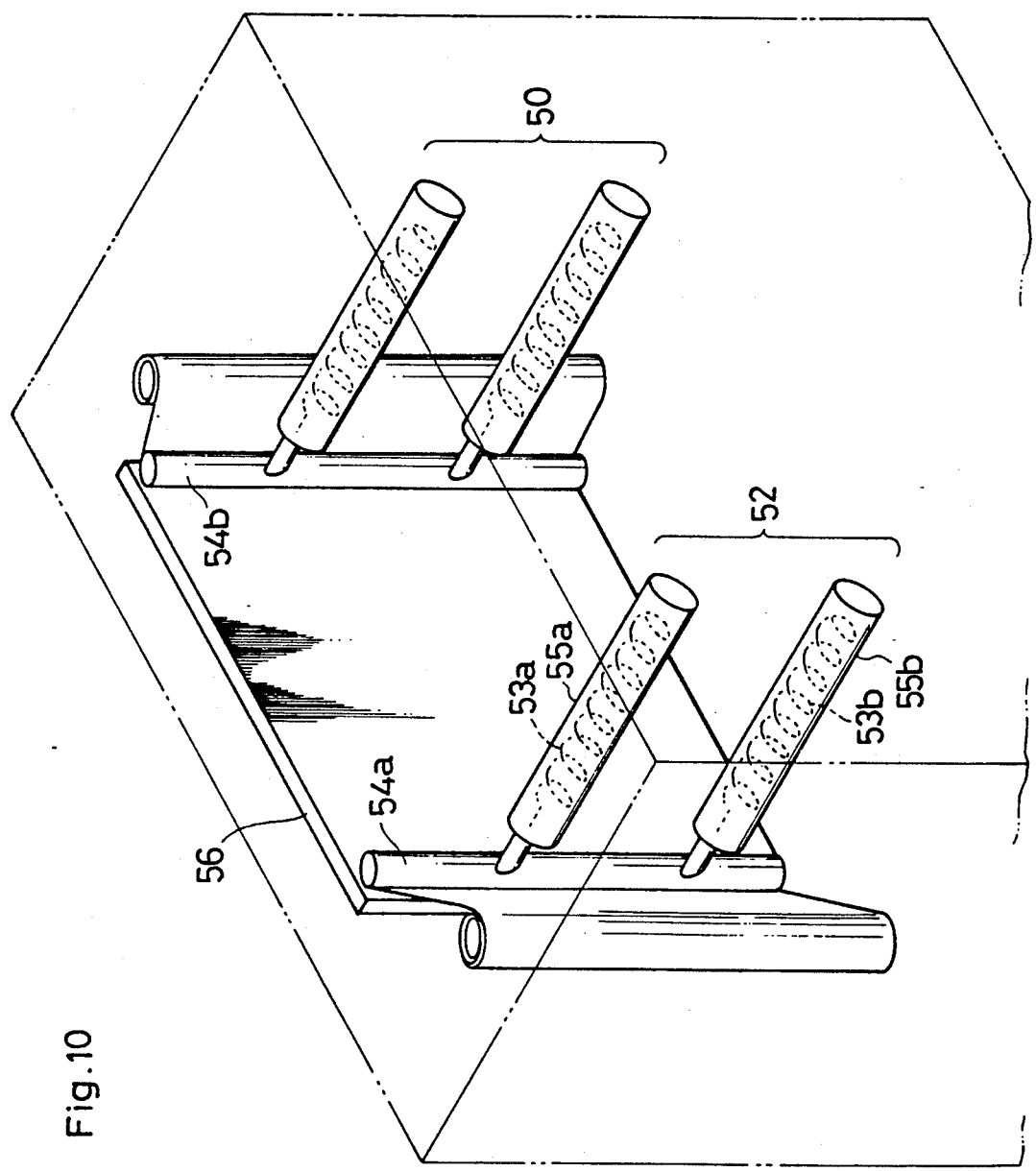
FIG. 10 is a perspective view for explaining the structure for preventing the slack of the light shield member 14.

FIG. 10 illustrates the elastic units 50 an 52. The elastic unit 52 comprises springs 53a and 53b, a press shaft 54a and pipes 55a and 55b. The spring 53a is inserted in the pipe 55a. One end of the spring 53a is connected with the press shaft 54a, another end is connected with the bottom of the pipe 55a. The spring 53b has the same structure as the spring 53a. The elastic unit 50 has the same structure as the elastic unit 52. It may be allowed to increase or decrease the number of the spring provided the elastic units 50 and 52. The press shafts 54a and 54b press the light shield member 14 by the elastic force of their springs 53a and 53b in order to absorb the slack.

Although in the above embodiments cloth is used as the light shield member 14, any other member will do if it is capable of being wound.

Also, it may be allowed in the present invention that the rotation of the winding shafts 24 and 26 is controlled so as to be in synchronism with the movement of the recording head 6.

Figure 11:
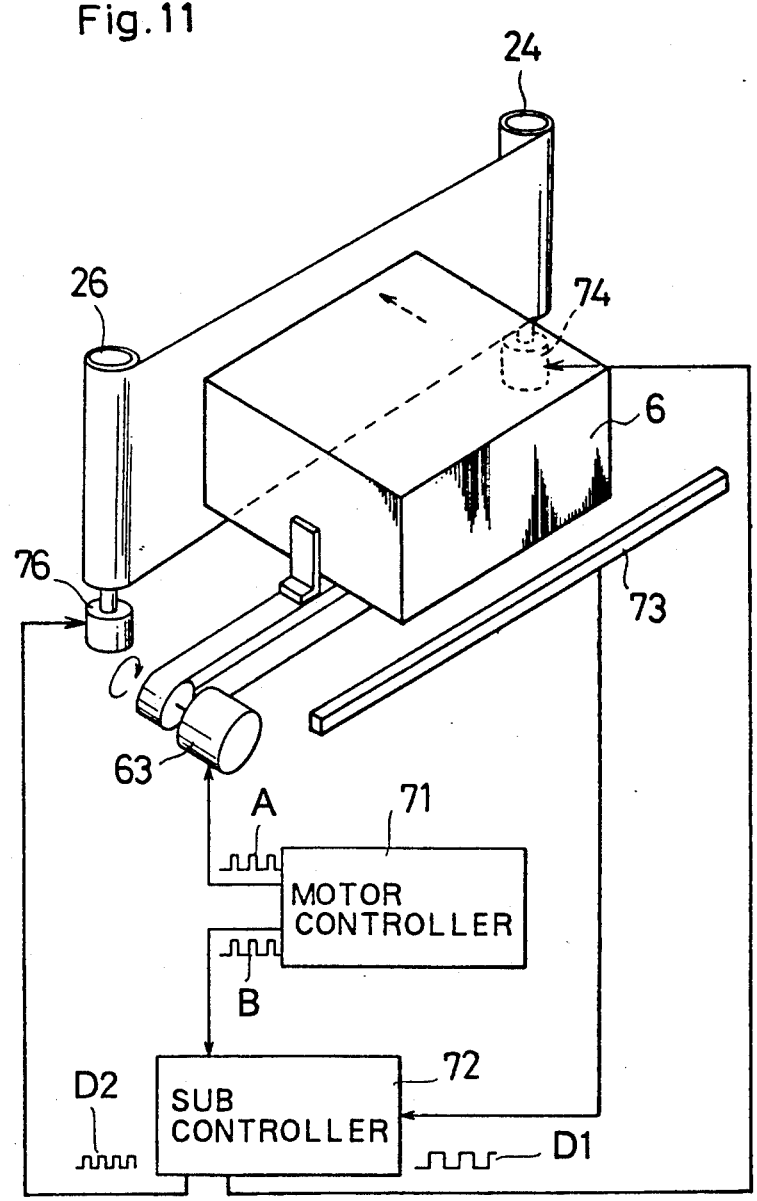
FIG. 11 is a perspective view for explaining another structure for preventing the slack of the light shield member 14.

FIG. 11 illustrates a control system for controlling the rotation of the winding shafts in synchronism with movement of the recording head. A motor controller 71 provides a drive signal A to the sub-scanning drive motor 63 to control the movement of the recording head 6 in the sub-scanning direction. A linear encoder 73 detects the sub-scanning position of the recording head 6, and provides a position signal that represents the sub-scanning position, to a sub controller 72. The motor controller 71 provides a drive signal B synchronized with the drive signal A to the sub controller 72.

When the recording head 6 is in such a position as shown in FIG. 6, a winding diameter α on the winding shaft 24 differs from a winding diameter β on the winding shaft 26. In such condition, it causes slack 15 of the light shield member 14 as shown in FIG. 7 to rotate the winding shafts 24 and 26 at the same angular velocity. The slack 15 may cause reduction in the light shielding effect.

In this embodiment, to prevent the slack, the winding shafts 24 and 26 are rotated with variable angular velocities in order that peripheral velocities of winded light shielding member 14 on the winding shafts 24 and 26 are the same.

The sub controller 72 provides a drive signal D1 to a reversible motor 74 for rotating the winding shaft 24 and a drive signal D2 to a reversible motor 76 for rotating the winding shaft 26. The frequencies of the drive signals D1 and D2 are determined with the sub controller 72 by converting the frequency of the drive signal B into that of the drive signals D1 and D2 on the basis of the position signal supplied from the linea encoder 73. Accordingly, each of the winding shafts 24 and 26 is rotated at the variable angular velocity based on the sub-scanning position of the recording head 6, and the same peripheral velocity is obtained.

The apparatus according to the present invention is so arranged that the recording drum is covered with the enclosure in which an opening is provided in the direction of movement of the recording head, the opening being covered with the light shield member whose both ends are taken up by the winding shafts, and the end portion of the recording head being inserted into the through hole provided to the light shield member. As a result, light shielding can be effected by an enclosure having such a size just as to cover the recording drum, thus facilitating the assembly and maintenance of the apparatus. Moreover, since the recording head is not accommodated in the enclosure, it is unlikely that heat radiated by the recording head will adversely affect the interior of the enclosure. In consequence, it is possible to provide an apparatus for recording an image easy to assemble and maintain and excellent in preventing the heat influence.

The apparatus according to the present invention has a transmission mechanism provided between the two winding shafts so as to make the same rotation in the winding shafts at both ends of the light shield member. This further ensures the winding of the light shield member along with movement of the recording head.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An apparatus for recording an image on a photosensitive material, comprising:
    a recording drum for holding said photosensitive material;
    first driving means for rotating said recording drum in a main scanning direction;
    an enclosure, made of an opaque material, for enclosing said recording drum, said enclosure having a transparent portion extending in a sub-scanning direction perpendicular to said main scanning direction;
    light shielding means for covering said transparent portion, said light shielding means having a through hole;
    a recording head for emitting a recording beam modulated by an image signal toward said photosensitive material held on said recording drum by way of said transparent portion and said through hole; and
    second driving means for transferring said recording head and said light shielding means in said sub-scanning direction.

2. An apparatus as claimed in claim 1, wherein said transparent portion of said enclosure is formed with an opening.

3. An apparatus as claimed in claim 2, wherein a part of said recording head is inserted in said opening, said part including an exit of said recording beam.

4. An apparatus as claimed in claim 3, wherein said recording head comprises:
    a body for accommodating a light source and optical devices; and
    an image forming lens for forming a spot of said recording beam on said surface of said recording drum, said image forming lens being inserted in said opening.

5. An apparatus for recording an image on a photosensitive material, comprising:
    a recording drum for holding said photosensitive material;
    first driving means for rotating said recording drum in a main scanning direction;
    an enclosure, made of an opaque material, for enclosing said recording drum, said enclosure having a transparent portion extended in a sub-scanning direction perpendicular to said main scanning direction, said transparent portion being formed with an opening;
    a recording head for emitting a recording beam modulated by an image signal toward the surface of said recording drum by way of said transparent portion, said recording head including a body for accommodating a light source and optical devices, a part of said recording head being inserted in said opening, said part including an exit of said recording beam;
    second driving means for transferring said recording head in said sub-scanning direction; and
    light shield means for preventing light other than said recording beam from transmitting in said enclosure, said light shield means including an opaque cloth for covering said opening.

6. An apparatus as claimed in claim 5, wherein said opaque cloth has first and second ends and wherein said light shield means further comprises:
    two winding shafts on which the first and second ends of said opaque cloth are respectively wound;
    a plurality of brackets for rotatively holding said winding shafts, and
    wherein said opaque cloth has a through hole in which said image forming lens is inserted.

7. An apparatus as claimed in claim 6 further comprising:
    a stay member attached one end thereof to said body of said recording head; and
    a fixing bracket for fixing another end of said stay member to said opaque cloth.

8. An apparatus as claimed in claim 7, further comprising first transmission means for ensuring that the winding of said opaque cloth is wound on said winding shafts.

9. An apparatus as claimed in claim 8, said first transmission means comprising two pulleys attached on said respective winding shafts, and a belt stretched across said pulleys.

10. An apparatus as claimed in claim 9, at least one of said winding shafts comprising:
    first and second shafts rotatively held with said respective brackets, said first shaft having said pulley and generating a rotative force upon rotation of said first shaft;
    a pipe attached to said second shaft; and second transmission means for transmitting the rotating force of said first shaft to said pipe.

11. An apparatus as claimed in claim 10, said second transmission means comprising:
   an intermediate disc, provided in said pipe, rotating in accordance with said pipe; and
   a coil spring for transmitting the rotating force of said first shaft to said intermediate disc.

12. An apparatus as claimed in claim 6, further comprising means for controlling each rotation of said winding shafts according to the transfer of said recording head in said sub-scanning direction.

13. An apparatus as claimed in claim 6, further comprising means for supplying the tension to said opaque cloth.

* * * * *